(12) United States Patent  (10) Patent No.: US 7,640,412 B2
Molaro et al.  (45) Date of Patent: Dec. 29, 2009

(54) TECHNIQUES FOR IMPROVING THE RELIABILITY OF FILE SYSTEMS

(75) Inventors: Donald Joseph Molaro, Cupertino, CA (US); Jorge Campello de Souza, Cupertino, CA (US); Richard M. H. New, San Jose, CA (US); Damien C. D. Le Moal, Sagamihara (JP)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 396 days.

(21) Appl. No.: 11/750,593

(22) Filed: May 18, 2007

(65) Prior Publication Data

US 2008/0168108 A1  Jul. 10, 2008

Related U.S. Application Data

(60) Provisional application No. 60/878,942, filed on Jan. 4, 2007, provisional application No. 60/878,903, filed on Jan. 5, 2007, provisional application No. 60/878,959, filed on Jan. 5, 2007.

(51) Int. Cl.
*G06F 12/16* (2006.01)
(52) U.S. Cl. .............................. 711/162; 707/202; 714/6
(58) Field of Classification Search ........................ None
See application file for complete search history.

(56) References Cited

U.S. PATENT DOCUMENTS 7,415,488 B1 * 8/2008 Muth et al. ................. 707/202
2006/0041524 A1  2/2006 Li et al.
2006/0092794 A1  5/2006 Takashima et al.

OTHER PUBLICATIONS

"Advanced Find EXT2 EXT3 Backup SuperBlock," Jul. 26, 2006.
"Microsoft Windows 95: Examining the FAT 32 System," Jan. 1998, pp. 1-4.
"COEN 252 Computer Forensics NTFS," 2004, pp. 1-5.
"ext3, From Wikipedia, the free encyclopedia," Dec. 1, 2006, pp. 1-3.
"HDF5 User's Guide: The File," Chapter 2, The HDF5 File, Aug. 1, 2006, pp. 1-18.
"HDF5/H5P API Specification, H5P: Property List Interface," Oct. 5, 2005, pp. 1-93.

* cited by examiner

*Primary Examiner*—Kevin Verbrugge
(74) *Attorney, Agent, or Firm*—Steven J. Cahill

(57) ABSTRACT

A system for enhancing the reliability of file systems is provided. In particular embodiments, the system includes a data storage device that includes one or more journal blocks, one or more primary metadata blocks, and one or more mirror metadata blocks. The system also includes a file system that writes metadata to the one or more journal blocks before writing the metadata to both the one or more primary metadata blocks and to the one or more mirror metadata blocks.

20 Claims, 4 Drawing Sheets

TECHNIQUES FOR IMPROVING THE RELIABILITY OF FILE SYSTEMS

CROSS-REFERENCES TO RELATED APPLICATIONS

This application claims the benefit of U.S. provisional patent application 60/878,942, filed Jan. 4, 2007, U.S. provisional patent application 60/878,903, filed Jan. 5, 2007, and U.S. provisional patent application 60/878,959, filed Jan. 5, 2007, which are incorporated herein by reference.

BACKGROUND OF THE INVENTION

The present invention relates to file systems, and more particularly, to techniques for improving the reliability of file systems.

A file system is a technique for storing and organizing computer files to facilitate the process of locating the files. File system software can be used to manage data blocks that are stored on a data storage device, such as a hard disk drive. The file system organizes the data blocks into files and directories. The file system also keeps track of which data blocks belong to which file and which data blocks are not being used. The data used by the file system to maintain such information is called metadata, and is often stored on the same storage device as the data files.

A hard disk drive may occasionally fail to provide accurate data to a user or application as a result of data block (sector) corruption. If such corruption occurs for file system metadata, an application may be unable to access data files and directories stored by the file system, even if these files and directories are not corrupted. Without a reliable backup of the data on a physically different storage device, or the implementation of a Redundant Array of Inexpensive Disks (RAID) level that provides fault tolerance, data can be irretrievably lost or become inaccessible. However, such methods require additional hardware (physically different storage device) to existing systems to be enabled.

A file allocation table (FAT) file system is a simple file system technique that organizes metadata. For example, a FAT file system uses a FAT table to list file names and data blocks associated with the file names. A FAT file system also indicates what files are free, and indicates which sectors of a hard disk drive are used for a given file. If the FAT table becomes corrupted, there may be a backup table available for repairing the corrupted FAT table. Other more advanced file systems such as the UNIX fast file system allow larger files systems to be created, and also have backup procedures.

However, the backup procedures associated with such file systems can result in high performance overhead, resulting in operation slowdown due to slower storage device accesses. For example, when a file system is used to store primarily multimedia data, such as audio and video files stored by set-top-boxes or personal video recorders, the performance overhead of file system backup procedures may result in an unacceptable delay of disk access, preventing such devices from operating efficiently during video playback or preventing some features from functioning properly. Therefore, it would be desirable to provide an improved method for handling data block corruption.

BRIEF SUMMARY OF THE INVENTION

The present invention provides techniques for enhancing the reliability of file systems. According to some embodiments of the present invention, the system includes a data storage device that includes one or more journal blocks, one or more primary metadata blocks, and one or more mirror metadata blocks. The system also includes a file system that writes metadata to the one or more journal blocks before writing the metadata both to the one or more primary metadata blocks and to the one or more mirror metadata blocks.

Other objects, features, and advantages of the present invention will become apparent upon consideration of the following detailed description and the accompanying drawings.

DETAILED DESCRIPTION OF THE INVENTION

Particular embodiments of the present invention enhance the reliability of data of file systems by using a journaling process to provide mirroring in a file system metadata. As described in more detail below, in one embodiment, the file system writes copies of any new or modified metadata to journal blocks before writing copies of the metadata to primary metadata blocks and mirror metadata blocks. Once the file system successfully writes the copies of metadata to the primary and mirror metadata blocks, the file system erases the copy of the metadata from the journal blocks. This technique ensures that uncorrupted metadata is stored in a primary location (e.g., primary metadata blocks) and a backup location (e.g., mirror metadata blocks). Mirroring of the file system metadata ensures that all files and directories can be accessed even if metadata corruption occurs.

As described in more detail below, in another embodiment, when a data storage device returns metadata that may contain errors, the file system may access the metadata in the mirror metadata block to retrieve a correct, uncorrupted copy of the requested metadata. The file system may also overwrite the corrupted metadata in the primary metadata blocks with the uncorrupted metadata from the mirror metadata blocks.

Figure 1:
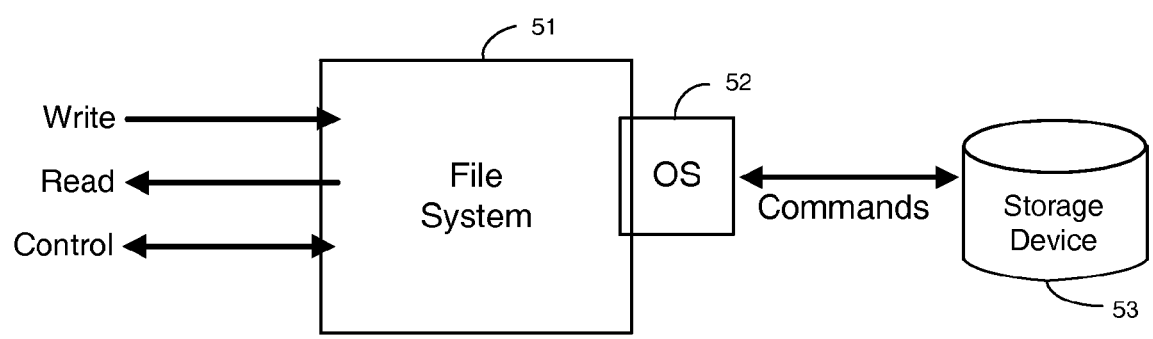
FIG. 1 is a block diagram that illustrates a file system, according to an embodiment of the present invention.

FIG. 1 is a block diagram that illustrates a file system 51, according to an embodiment of the present invention. In general, an operating system 52 uses a set of commands to access the file system 51. The file system 51 stores the commands, data, and metadata on a data storage device 53, such as a magnetic hard disk drive, an optical drive, etc.

In general, hard disk drives (also referred to herein as hard drives) are logically formatted into one or more partitions that contain one or more logical file systems. One function of the file system 51 is to maintain the physical location of file data on the data storage device 53. The physical location of the file data may be maintained using metadata also stored on the data storage device 53. Occasionally, a hard drive may experience data block corruption, resulting in data loss. As described in more detail below, the file system 51 can recover from metadata corruption errors by performing metadata mirroring so that all data files and directories stored within the file system 51 can still be accessed by applications, thereby improving the fault tolerance of the data storage device 53, as well as the overall file system 51.

Figure 2:
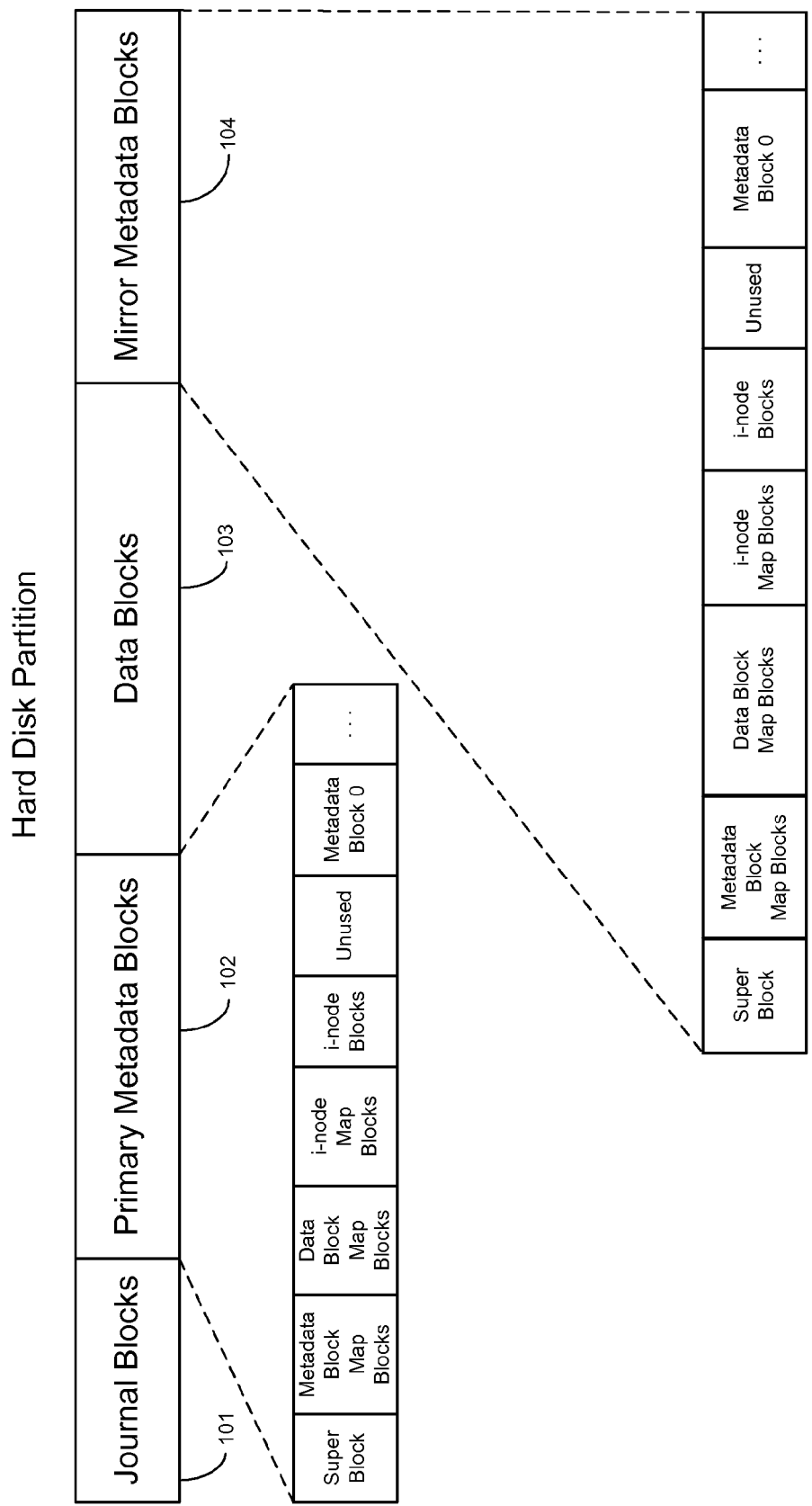
FIG. 2 is a block diagram that illustrates a partition on a data storage device for a file system that contains mirror metadata blocks used to store a copy of the metadata stored in the primary metadata blocks, according to an embodiment of the present invention.

FIG. 2 is a block diagram that illustrates partitions on a data storage device (e.g., hard drive) for a file system that contains mirror metadata blocks used to store a copy of the metadata stored in the primary metadata blocks, according to an embodiment of the present invention. The hard drive partition shown in FIG. 2 includes journal blocks 101, primary metadata blocks 102, data blocks 103, and mirror metadata blocks 104. In a particular embodiment, the file system uses the mirror metadata blocks 104 to store a copy of the metadata stored in the primary metadata blocks 102.

As FIG. 2 shows, the data storage device 53 is logically separated into multiple storage areas (e.g., journal blocks 101, primary metadata blocks 102, data blocks 103, and mirror metadata blocks 104). As described in more detail below, these storage areas provide redundant metadata, thereby reducing the likelihood of file system failure due to metadata corruption. In one embodiment, the primary metadata blocks 102 and the mirror metadata blocks 104 are identical and both maintain information about the underlying file system, such as a directory catalog. A directory catalog indicates which blocks are allocated to a file, and which blocks are unallocated. In other particular embodiments, the metadata in the mirror metadata blocks 104 may be encoded.

When the file system 51 reads data either from data blocks 103 or from primary metadata blocks 102 of the data storage device 53, the data storage device 53 may detect and correct errors in the data blocks using an error detection and correction scheme. After the data storage device 53 has performed error correction routines on the data blocks, the corrected data may then be transmitted to the operating system 52 that requested the data. Although the data storage device 53 provides a degree of error correction capability, the data storage device 53 cannot correct all possible errors that might occur in data blocks. Under certain circumstances, when data blocks are corrupted, the data storage device 53 sends whatever data it can recover back to the requesting operating system 52 rather than returning no data. The data storage device 53 may also send information to the operating system 52 to indicate which data blocks are likely to have been corrupted and could not be corrected.

As described in more detail below, if data corruption occurred while retrieving metadata from the primary metadata block 102, the file system 51 may use the copy of the metadata in the mirror metadata blocks 104 to recover from the data corruption. File system level corruption of the metadata copies may occur, for example, if the system is powered down when the file system has updated only the primary copy of the metadata and not its mirror. In such a case, using the mirror metadata blocks 104 to correct any data corruption of the primary metadata blocks 102 reported by the data storage device 53 may result in the file system corruption, because the metadata block is repaired using an incorrect mirror (old copy) of the metadata block.

As described in more detail below in connection with FIG. 3, the file system 51 also combines a journaling process with a mirroring process to effectively backup metadata. Generally, file system journaling is a process by which file system updates are atomic, such that they are complete or considered to be incomplete in their entirety. Many file system operations require that the file system metadata be updated (e.g., file create, delete or update). The journaling process is outlined as a complete description of the file system update and is written to the journal of the file system including an atomically written commit block; only then is the real metadata of the file system updated. The journal is only erased when the file system metadata is modified to conform to the transaction in the journal.

Because the system only commits a complete transaction from the journal, and successful journal transactions must include an atomically written commit block, it is possible to ensure that file system metadata is always consistent. Generally, if an error occurs (e.g., due to a power interruption) at any point during this process, journaling prevents data from being corrupted. Specifically, the file system 51 can determine exactly when the problem occurred and may simply resume the journaling process at the appropriate point by reading the information in journal blocks 101. In particular embodiments, this journaling process is integrated with a backup process to effectively backup valid metadata and to access the valid metadata when needed.

Figure 3:
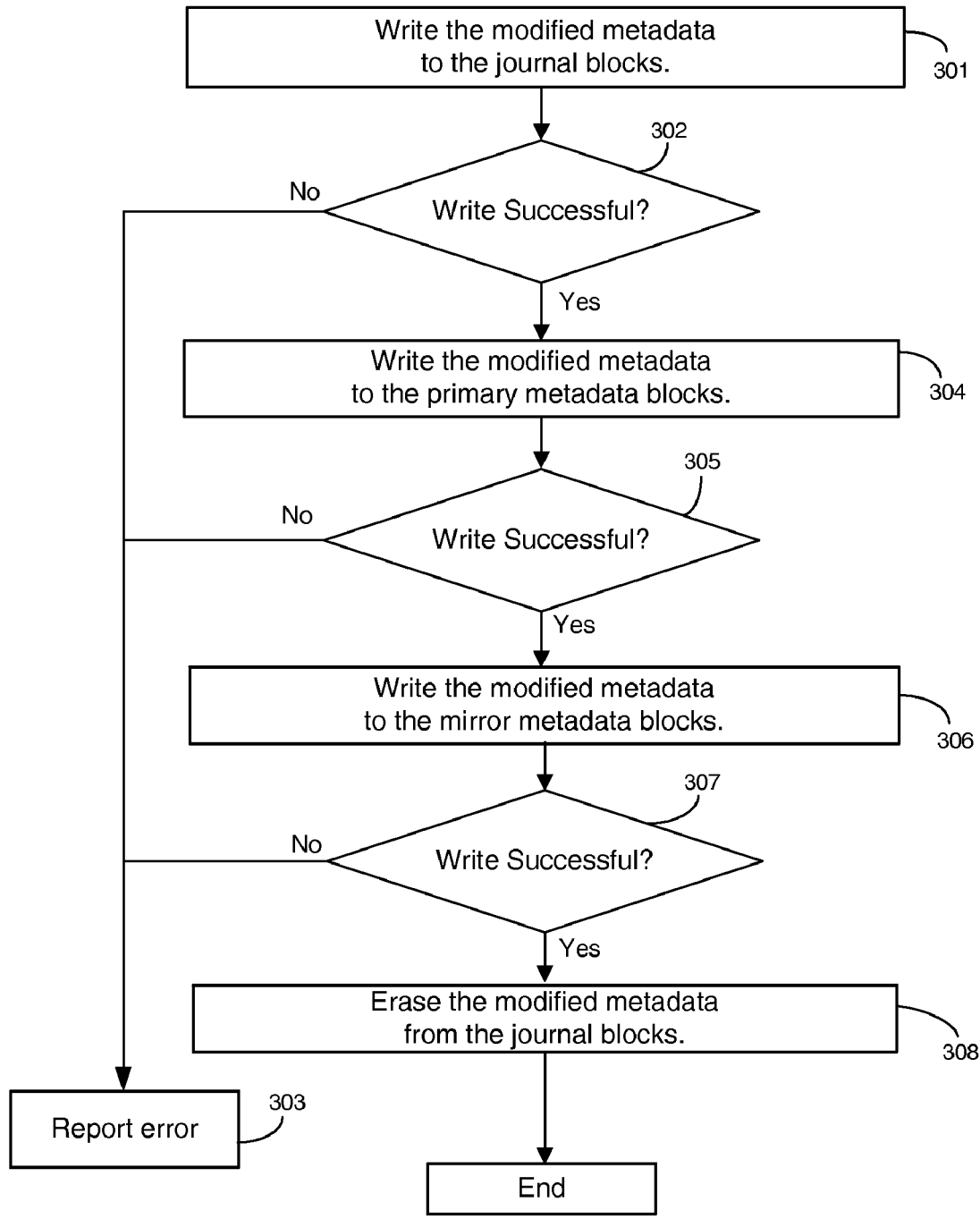
FIG. 3 is a flow chart that illustrates a process for modifying metadata, according to an embodiment of the present invention.

FIG. 3 is a flow chart that illustrates a process for modifying metadata (e.g., storing new or updated metadata), according to an embodiment of the present invention. The process begins at step 301 where, in response to a user-initiated file operation (e.g., write operation), the file system 51 writes any new or updated metadata to the journal block 101. At step 302, the file system 51 determines if the write operation was successful. If not, at step 303, the file system 51 reports an error. If the write operation was successful, at step 304, the file system 51 writes the new or updated metadata to the primary metadata blocks 102. At step 305, the file system 51 determines if the write operation was successful. If not, at step 303, the file system 51 reports an error. If the write operation was successful, at step 306, the file system 51 writes the new or updated metadata to the mirror metadata blocks 104. Any fatal system error such as a power interruption at any point during the processing of steps 304 or 306 may leave the file system in a corrupted state. However, in one embodiment, any corruption within the file system may be recovered from by restarting the process of FIG. 3 using the copy of the valid metadata stored in the journal blocks 101, which was stored before the system fatal error occurred. In one embodiment, if a fatal system error occurs during step 302, the metadata modification may be lost but the file system state is not corrupted, because no metadata modification on the data storage device was performed.

Once the file system 51 has stored the modified metadata (e.g., new or updated metadata) at both the primary metadata blocks 102 and the mirror metadata blocks 104, the metadata stored in the journal blocks 101 may be safely be erased, as both copies of the metadata blocks in both the primary metadata blocks 102 and the mirror metadata blocks 104 are identical. Accordingly, at step 307, the file system 51 determines if the write operation was successful. If not, at step 303, the file system reports an error. If the write operation was successful, at step 308, the file system 51 erases the metadata from the journal blocks 101 and the update process ends. In one embodiment, erasing the metadata from the journal blocks 101 indicates that the update was successful.

In particular embodiments, the mirroring of metadata is a separate process from any process involving mirroring of file data. For example, in one embodiment, the metadata may be mirrored while the file data is not mirrored. This prevents the degradation of the performance of the file system, as additional resources are saved that may otherwise be allocated to the processing and storage of backup file data.

In one embodiment, the separation of metadata blocks and data blocks allows for different sizes of metadata and data blocks. In some embodiments, the block sizes of metadata blocks and data blocks may be configurable sizes for both types of blocks. For example, the relative size of the primary and mirror metadata blocks may be reduced relative to the size of the data blocks; the smaller metadata blocks reduce the amount of the disk storage space needed for metadata mirroring. In a specific example involving high-density video files, a very large data block (in the order of megabytes) may have a corresponding smaller metadata block (in the order of 512 bytes or 4 kilobytes). The large data block size reduces I/O fragmentation due to file fragmentation and allows larger direct memory access (DMA). The smaller metadata block size reduces the journaling overhead and the amount of disk storage and/or memory needed for mirroring of the metadata blocks. Smaller metadata blocks also reduce input/output (I/O) noise that can be caused by metadata block access to/from the disk. In the case of multimedia data as processed by set-top-boxes or personal video recorders, the coding of these data can generally provide a level of error correction allowing the handling, at the application level, of any file data corruption.

Figure 4:
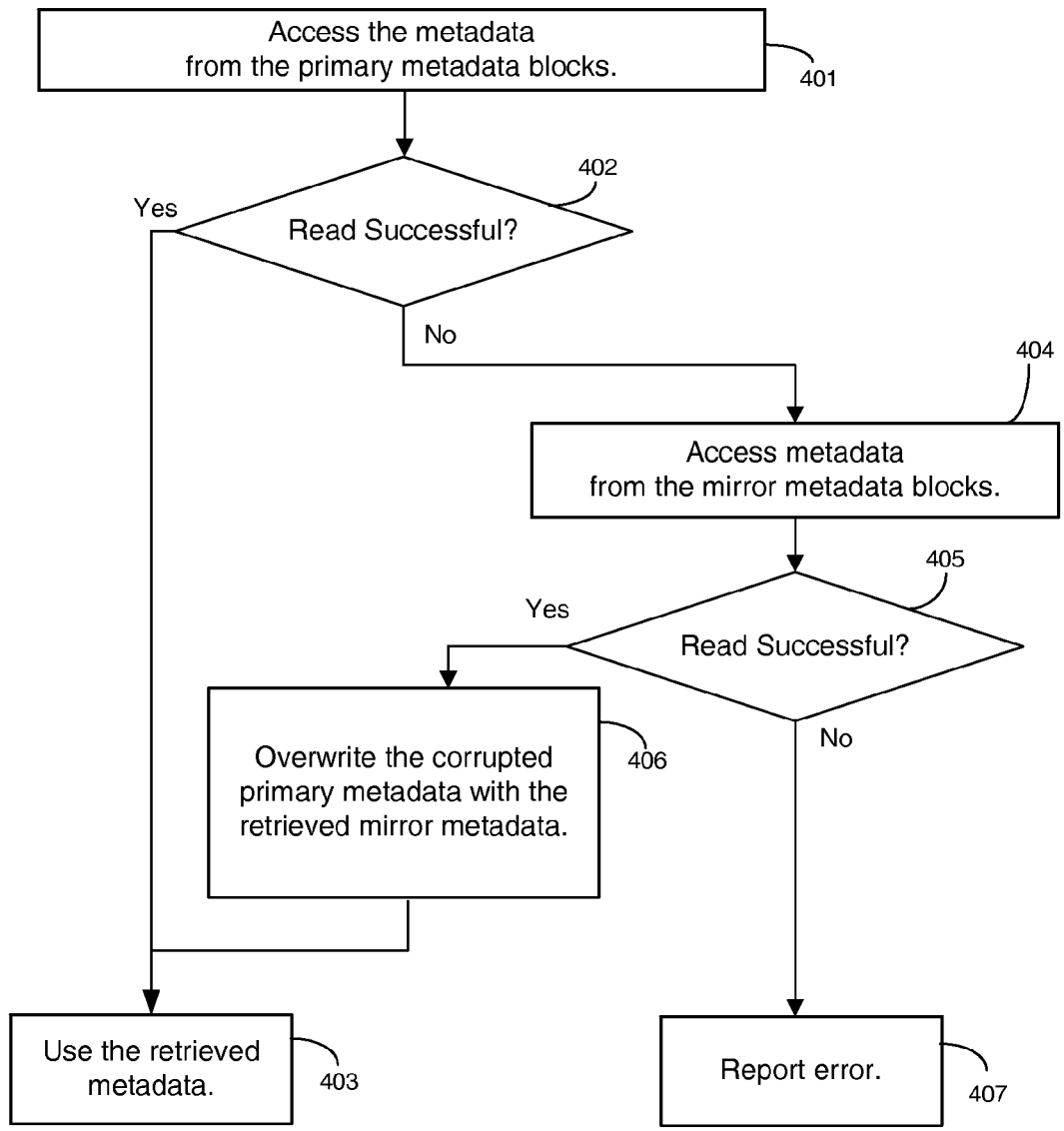
FIG. 4 is a flow chart that illustrates a process for recovering from a read error when accessing corrupted metadata, according to an embodiment of the present invention.

FIG. 4 is a flow chart that illustrates a process for recovering from a read error when accessing corrupted metadata, according to an embodiment of the present invention. The process begins at step 401, where in response to a user-initiated file operation (e.g., a read operation), the file system 51 accesses (e.g., reads) metadata from the primary metadata block 102. At step 402, the file system 51 then determines if the read operation is successful. If so, at step 403, the file system 51 uses the retrieved metadata. If the read operation is not successful, at step 404, the file system 51 accesses the metadata from the mirror metadata blocks 104. The read operation would not be successful if the metadata were corrupted.

In one implementation, the file system 51 detects the corruption of the metadata within the metadata block using the information returned by the data storage device 53. For example, in a specific embodiment, after the file system 51 issues a command to a disk drive and upon completion of the command, the file system 51 may examine the contents of a status register to determine if the read encountered any problems. In a specific embodiment, the metadata from the mirror metadata blocks 104 are an exact copy of the (uncorrupted) metadata from the primary metadata blocks 102. In some particular embodiments, the metadata from the mirror metadata blocks 104 may be encoded.

At step 405, the file system 51 determines if the read operation was successful. If data storage device 53 does not report any corruption error, at step 406, the file system 51 overwrites the metadata of the corrupted primary metadata blocks 102 with the retrieved data from the mirror metadata blocks 104. This repairs the corrupted primary metadata blocks 102 and prevents any subsequent access to the same block from resulting in a corruption error. At step 407, if the read operation is not successful, the file system 51 reports an error.

In one embodiment, if the file system 51 has determined that the primary metadata is corrupted, the file system 51 may use backup metadata in the mirror metadata blocks 104 as an alternative to the primary metadata in the primary metadata blocks 102. As such, in one embodiment, the file system 51 may backup the metadata (e.g. elsewhere in the mirror metadata blocks 104) until a full check of the file system 51 can be performed.

In one embodiment, during file system recovery (e.g., after a system crash), the file system 51 may utilize the journal blocks 101 along with any combination of the primary and secondary metadata blocks 102 and 104 to recover back to a known state.

The foregoing description of the exemplary embodiments of the present invention has been presented for the purposes of illustration and description and are not intended to be exhaustive or to limit the scope of the present invention to the embodiments disclosed. A latitude of modification, various changes, and substitutions are intended in the present invention. In some instances, features of the present invention can be employed without a corresponding use of other features as set forth. Many modifications and variations are possible in light of the above teachings, without departing from the scope of the present invention.

For example, embodiments of the present invention may be implemented using hardware, software, a computer-readable medium containing program instructions, or a combination thereof. Software written according to the present invention or results of the present invention may be stored in some form of computer-readable medium such as memory, hard drive, CD-ROM, DVD, or other media for subsequent purposes such as being executed or processed by a processor, being displayed to a user, etc. Also, software written according to the present invention or results of the present invention may be transmitted in a signal over a network. In some embodiments, a computer-readable medium may include a computer-readable signal that may be transmitted over a network. It is intended that the scope of the present invention be limited not with this detailed description, but rather by the claims appended hereto.

The invention claimed is:

1. A system for enhancing the reliability of file systems, the system comprising:
 a data storage device that stores metadata, the data storage device comprising at least one journal block, at least one primary metadata block, and at least one mirror metadata block; and
 a file system that writes metadata to the journal block before writing the metadata to the primary metadata block and to the mirror metadata block.

2. The system defined in claim 1 wherein the file system erases the metadata from the journal block after the file system successfully writes the metadata to the primary metadata block and to the mirror metadata block.

3. The system defined in claim 1 wherein the file system overwrites any corrupted metadata in the primary metadata block with uncorrupted metadata from the mirror metadata block.

4. The system defined in claim 1 wherein the file system reattempts to write the metadata from a copy of the metadata stored in the journal block if a given write operation to the primary metadata block or the mirror metadata block fails.

5. The system defined in claim 1 wherein the file system performs mirroring of metadata separate from any process involving mirroring of file data.

6. The system defined in claim 1 wherein the data storage device utilizes the at least one journal block in combination with any of the at least one primary metadata block and the at least one mirror metadata block during file system recovery.

7. A method for storing metadata in a data storage device, the method comprising:
 writing metadata to at least one journal block of a data storage device; and
 writing the metadata to at least one primary metadata block and to at least one mirror metadata block of the data storage device after the metadata has been successfully written to the journal block.

8. The method defined in claim 7 further comprising erasing the metadata from the journal block after the metadata has been successfully written to the primary metadata block and to the mirror metadata block.

9. The method defined in claim 7 further comprising overwriting any corrupted metadata in the primary metadata block with uncorrupted metadata from the mirror metadata block.

10. The method defined in claim 7 further comprising reattempting to write the metadata from a copy of the metadata stored in the journal block if a given write operation to the primary metadata block or the mirror metadata block fails.

11. The method defined in claim 7 further comprising generating an error report if a given write operation to the primary metadata block or the mirror metadata block fails.

12. The method defined in claim 7 further comprising mirroring of metadata separate from any process involving mirroring of file data.

13. The method defined in claim 7 further comprising using backup metadata in the at least one mirror metadata block as an alternative to primary metadata in the at least one primary metadata block if the primary metadata is corrupted.

14. The method defined in claim 7 further comprising utilizing the at least one journal block in combination with any of the at least one primary metadata block and the at least one mirror metadata block during file system recovery.

15. A computer system that comprises code for storing metadata in a data storage device, wherein the code is stored on a computer readable medium, the computer system comprising:

code for writing metadata to a journal block of a data storage device; and code for writing the metadata to a primary metadata block and to a mirror metadata block of the data storage device after the metadata has been successfully written to the journal block.

16. The computer system defined in claim 15 further comprising code for erasing the metadata from the journal block after the metadata has been successfully written to the primary metadata block and to the mirror metadata block.

17. The computer system defined in claim 15 further comprising code for overwriting any corrupted metadata in the primary metadata block with uncorrupted metadata from the mirror metadata block.

18. The computer system defined in claim 15 further comprising code for reattempting to write the metadata from a copy of the metadata stored in the journal block if a given write operation to the primary metadata block or the mirror metadata block fails.

19. The computer system defined in claim 15 further comprising code for generating an error report if a given write operation to the primary metadata block or the mirror metadata block fails.

20. The computer system defined in claim 15 further comprising code for mirroring of metadata separate from any process involving mirroring of file data.

* * * * *